United States Patent [19]

Goldie

[11] 4,130,821
[45] Dec. 19, 1978

[54] FREQUENCY-AGILE FIRE CONTROL RADAR SYSTEM

[75] Inventor: Harry Goldie, Randallstown, Md.

[73] Assignee: The United States of America as represented by the Secretary of the Navy, Washington, D.C.

[21] Appl. No.: 785,974

[22] Filed: Apr. 8, 1977

[51] Int. Cl.² ............................................. G01S 7/28
[52] U.S. Cl. ........................................... 343/17.1 R
[58] Field of Search .............................. 343/17.1 R

[56] References Cited

U.S. PATENT DOCUMENTS

| 3,688,313 | 8/1972 | Kern | 343/7 A X |
|---|---|---|---|
| 3,797,018 | 3/1974 | Thompson | 343/17.1 R |
| 4,044,357 | 8/1977 | Goldie | 343/17.5 |

Primary Examiner—T.H. Tubbesing

Attorney, Agent, or Firm—Richard S. Sciascia; George A. Montanye

[57] ABSTRACT

A signal processing system for simultaneously transmitting a plurality of carrier frequencies and receiving certain of said frequencies to the exclusion of others. In a radar system employing the disclosed technique, a CW carrier and pulsed modulated carrier are transmitted simultaneously from a single antenna. The CW carrier and the echo frequency from the modulated carrier are received by a receiver protector circuit which passes the low power echo of the pulse modulated carrier to receiver processing circuitry while suppressing the CW carrier having a power level above a predetermined threshold. The receiver protector enables the use of plural carrier frequencies in a frequency agile system with decreased frequency separation.

13 Claims, 1 Drawing Figure

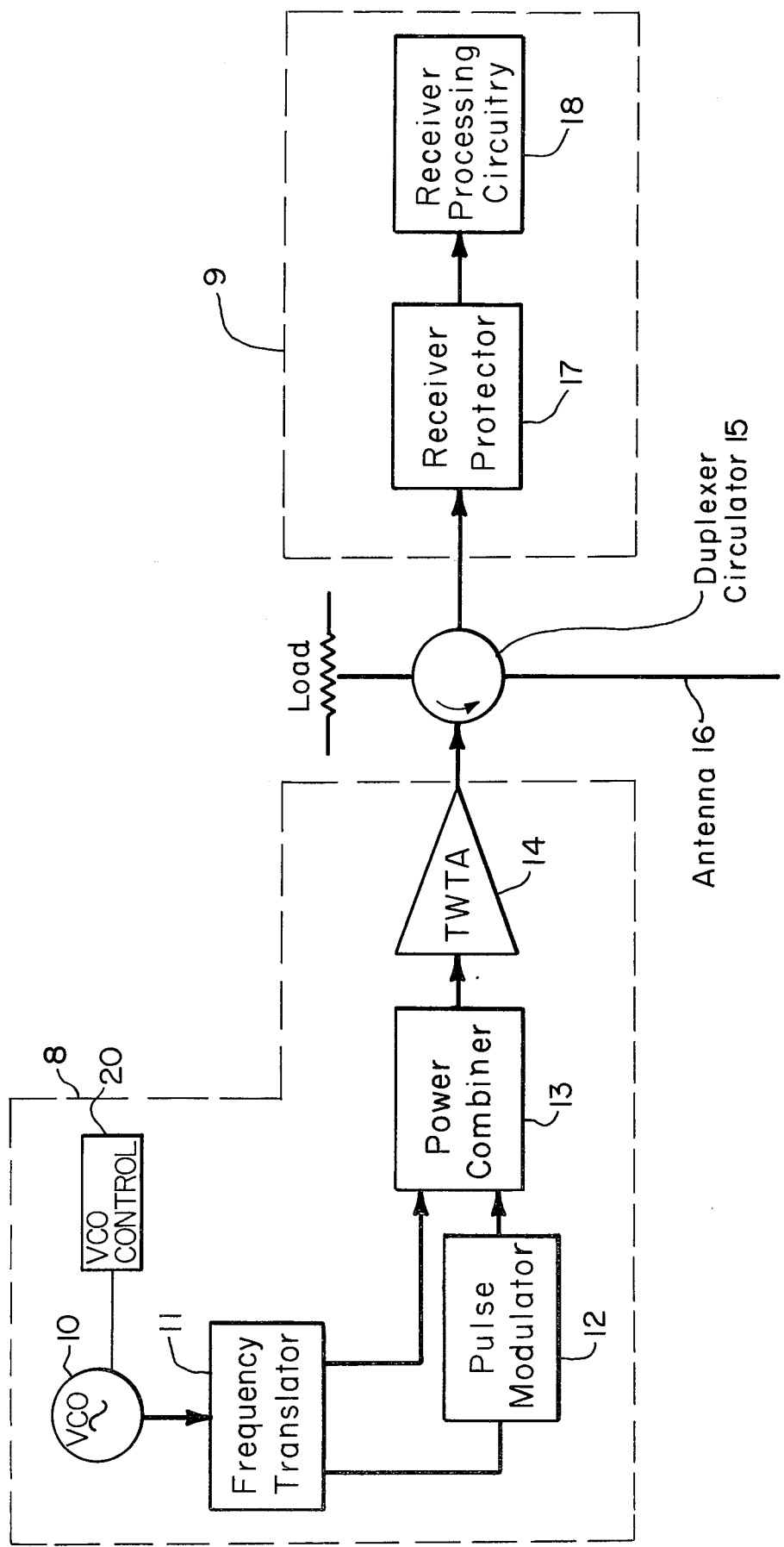

FREQUENCY-AGILE FIRE CONTROL RADAR SYSTEM

BACKGROUND OF THE INVENTION

The present invention relates to signal processing systems and more particularly to improved systems and techniques for providing plural frequency discrimination without the use of filter circuits.

Generally, in signal transmitting and receiving systems, such as radar systems, wherein it is desired to simultaneously transmit a plurality of carrier frequencies while discriminating between the received frequencies, the prior art has utilized transmitters and receivers which employ frequency filters to separate the carriers and define fixed frequency bands. Such systems, exemplified by fire control radar systems, may employ a CW carrier as the missile guidance microwave frequency and a pulse modulated carrier as the search and tracking frequency. The two carrier frequencies, which may be generated by employing a diplexer and CW reject filters, can be simultaneously transmitted through a single antenna as long as the frequency separation between the carriers is great enough to enable the receiving filters to reject the CW carrier while passing the pulsed carrier.

While such systems have had some success in providing for multiple frequency transmission and reception, the power losses incurred and the restrictions on frequency separation have severely limited their usefulness in a variety of situations. By way of example, such systems are incapable of providing the frequency agility that may be necessary in countermeasure environments since the filter requirements fix the frequencies to predefined bands during operation. In addition, the available frequency range is further limited by the wide frequency separation required for proper filtering in the transmitter and receiver. The filters, in turn, provide additional attenuation losses and matching problems that reduce the quality and power of the signals received in the receiver processing circuitry. Such limitations severely affect the range, accuracy, and environments in which the conventional systems can be readily employed.

As an alternative to the use of filters, other systems have attempted to utilize various configurations of multiplexing and switching circuitry to enable plural signal transmission. Such systems usually employ CW and pulsed signals alternately transmitted from the same antenna depending on the function desired at any given time. By way of example, the system as disclosed in U.S. Pat. No. 3,688,313 utilizes the CW signal to obtain initial target acquisition information relating to velocity and frequency, and thereafter switches to an angle tracking and search mode using pulsed signals for further processing of desired information. As can be seen, however, this system requires the transmission to be alternated between CW and pulsed and does not enable the simultaneous transmission of the plural signals from the same antenna.

Other systems, as exampled by U.S. Pat. Nos. 2,813,198; 2,909,774; 3,015,099; and 3,183,508; employ various configurations which enable the use of a single antenna for transmission and reception of one or plural signals. While each of the techniques attempt to solve particular problems with the described structure, there is still a continuing need for systems with improved versatility in the areas of frequency agility and high power protection for plural frequency operation.

Accordingly, the present invention has been developed to overcome the specific shortcomings of the above-known and similar techniques and to provide a system for enabling effective frequency discrimination and protection in a single antenna transmitting and receiving system.

SUMMARY OF THE INVENTION

It is therefore an object of the present invention to provide a plural signal transmitting and receiving system having fewer components and improved signal quality.

Another object of the invention is to provide a signal transmitting and receiving system that improves frequency agility and reduces the requirements for frequency separation.

A further object of the invention is to provide a receiver protector in a signal transmitting and receiving system which attenuates signals at the incident frequency at power levels above a given threshold for frequencies over a wide range.

Still another object of the invention is to provide a plural signal transmitting and receiving system that is capable of reducing power losses for simultaneous signal generation and detection.

In order to accomplish the above and other objects, the present invention employs a frequency selective ferrite limiter in the receiver portion of a plural frequency transmitting and receiving system. The ferrite limiter is constructed to have characteristics such that it will attenuate incident radiation above a predetermined threshold value and pass all frequencies at a power level below the threshold. When the limiter is included in the receiver, frequency discrimination can be obtained without the use of filters as long as a minimum separation is maintained between the signal frequencies. The plural signals may be obtained from a single transmitter by offsetting one generated carrier frequency to form separate carrier signals. One such signal may be a pulse modulated carrier and another a CW carrier combined for simultaneous transmission from a single antenna. By selecting the proper limiter characteristics, a return signal from the pulsed modulated carrier will be less than the threshold value of the limiter thereby enabling the return signal to pass to processing circuitry while the CW signal is blocked. As long as the proper frequency separation is maintained, the system will allow the reception and processing of the pulse signal simultaneous with the transmission of the CW signal and facilitate frequency agility and discrimination in different environments.

Other objects, advantages and novel features of the invention will become apparent from the following detailed description when considered with the accompanying drawing wherein:

BRIEF DESCRIPTION OF THE DRAWING

The FIGURE is a schematic diagram of the signal processing system employing a receiver protector in accordance with the present invention.

DETAILED DESCRIPTION OF A PREFERRED EMBODIMENT

Referring now to the drawing, a plural signal transmitting and receiving system is illustrated in accordance with the teachings of the present invention. As shown, the device generally includes a signal generating portion 8 and a signal receiving portion 9 with both portions coupled to a duplexer circulator 15 and antenna 16 for simultaneously transmitting and receiving plural signals. While the generating and receiving portions have been shown to be separated by the dotted lines, such is for purposes of illustration only and is not intended to limit the configuration of the device which could be constructed as an integral unit or in any manner consistent with the operation of the invention.

Turning first to the generating portion 8, the same is generally constructed from conventional components including a signal generator 10, for producing a carrier frequency $f_1$, having its output coupled to a frequency translator 11. The frequency translator 11 can be of any conventional construction capable of providing two output signals including the carrier frequency $f_1$ and a signal $f_2$ offset from the carrier frequency and separated by a frequency $\Delta f$ where $\Delta f = f_1 - f_2$. The output $f_2$ is coupled to a pulse modulator 12 which impresses appropriate modulation on the carrier $f_2$. The $f_1$ signal and the modulated $f_2$ signal are then both coupled to the power combiner 13. The pulse modulator 12 can be any well known circuitry capable of impressing pulse modulation on the carrier $f_2$ according to the requirements of the signal transmission system. The power combining circuitry 13 can also be of conventional construction and may be, for example a 3db hybrid circuit which combines the frequency $f_1$ and the pulse modulated frequency $f_2$ and provides a signal output therefrom. The power combiner 13 is constructed such that the power is combined independent of amplitude, phase, and frequency over the frequency band of the combiner, which characteristics will be determined by the specific construction utilized. The output from the combiner 13 is subsequently coupled to a traveling wave tube amplifier (TWTA) wherein the signals are amplified to the proper power levels for subsequent transmission.

In contrast to prior systems, the present generating circuit provides for the production of plural signal carrier frequencies without the previous transmit/receive losses necessitated by the use of diplexer and CW reject filters. The present circuit utilizes a low power transmitter 10 and frequency translator 11 to form the plural signals, and performs the power combining at low power in the 3db hybrid circuit prior to amplifying the signals thereby eliminating the necessity for plural high power transmitters. The signal generator 10 can additionally be made to change the signal frequency instantaneously and therefore vary the frequencies $f_1$ and $f_2$ provided at the output of the frequency translator 11. By way of example, the signal generator 10 can be constructed as a voltage controlled oscillator (VCO) wherein the frequency is controlled by varying the input voltage to the VCO by VCO control 20. Control of the frequency separation $\Delta f$ can then be maintained through the frequency translator 11 in order to provide a frequency separation at any selected value necessary for the operation of the system.

Referring again to the FIGURE, the output from the TWTA 14 is coupled to a conventional duplexer circulator 15 at appropriate input ports. The duplexer circulator 15 is likewise coupled to antenna 16 and any necessary load in such manner as to couple the plural signal output from the TWTA to the antenna 16. An output port from the duplexer circulator 15 is also coupled to the input of the receiving circuitry 9 to provide return signals from the antenna 16 for appropriate processing. The receiving circuitry 9 generally includes a receiver protector 17 designed to discriminate between plural input frequencies such that selected signals may pass to the receiving processing circuitry 18 even in the presence of other signals. The receiving processing circuitry 18 can then include conventional filters, mixers, limiters, display devices, and any other circuitry necessary for producing a visual or electronic output signal representing the information contained by the selected signal received at the antenna 16.

In the systems of the prior art, the receiving circuitry 9 would generally include plural filters necessary for separating plural received frequencies in order to discriminate between the desired frequency and unwanted signals. Such filtering circuits restricted reception to discrete frequency bands and required the physical substitution of different filters or the use of complex switching circuitry to enable frequency agility. In addition, such filters produced signal attenuation which reduced the accuracy and quality of any return signals from the antenna 16. Since the information content of a return signal is dependent on the amplitude and reproducibility of a low power echo, it can be easily understood that any attenuation or interference from other carriers produced by the circuitry 17 would normally deplete the information content of the received signal.

In accordance with the present invention, therefore, a receiver protector 17 is utilized which is selected to have such characteristics that it will limit the rf signal only at frequencies of incidence where the power of the signal exceeds a threshold value. This receiver protector may be, for example, a ferrite limiter of conventional construction. Such limiters, as exampled in the articles of the *IEEE Transactions on Electromagnetic Compatibility*, Volume EMC-10, No. 2, June 1968, pp. 273–283 and *IEEE Transactions on Microwave Theory and Techniques*, Volume MTT-18, September 1970, pp. 652–654, will provide the above-noted characteristics without substantial attenuation or signal interference even in the presence of a plurality of signals. Generally, the ferrite limiter is capable of providing operation over a broad band of frequencies wherein all incident low level signals having a frequency within the pass band of the device will be provided as outputs from the limiter, and all incident frequencies having a power level exceeding the threshold of the device will be severely limited and blocked from transmission so long as minimum separation between the frequencies is maintained. While the particular characteristics of the limiter depend on its specific construction, pass bands of 300 MHz for a minimum separation $\Delta f$ of 5 MHz are easily obtained. The limiter therefore facilitates the discrimination between plural frequencies such that the signal will be coupled to the processing circuitry only at selected power levels governed by the limiter. Such construction therefore protects subsequent circuitry by limiting high power signals and prevents mixing and interference between plural carriers that may be received by the receiver protector 17. Accordingly, the protector will provide a signal having increased quality which may be further distinguished and utilized in the processing circuitry 18.

The operation of the system will now be described with reference to the FIGURE and more particularly with respect to its operation as a typical fire control radar. In such radar applications, plural frequencies will be generated for missile control and radar observation wherein the missile control frequency will be CW and the search and tracking signal frequency will be pulse modulated. In the present example, the identified frequencies $f_1$ and $f_2$ are produced by the generator 10 and translator 11 (which may provide for electronically adjustable separation) with appropriate modulation applied to $f_2$ by pulse modulator 12. Both signals will then be simultaneously transmitted by the antenna 16 after appropriate combining and amplifying by the elements 13 and 14. Utilizing the present configuration, the antenna 16 is capable of providing return signals to the protector 17 simultaneous with the transmission of the CW carrier signal. Accordingly, both high power CW signals and low power echo signals will be received by the receiver protector 17. However, the high power CW signal incident on the receiver protector 17 will be severely limited since the protector 17 will be chosen to have a threshold below the expected value of the CW signal. The return of the pulse modulated carrier, on the other hand, will be passed on the processing circuitry 18 since the threshold will be selected to be above the power level of the expected pulsed return signal. The protector 17 will thus act to protect the circuitry 18 from high power CW signals $f_1$ as well as high power pulsed signals $f_2$ and only pass those desired return signals having a power level below the threshold value.

As can be seen from the above description, the present invention provides significant advantages over the prior systems, some of which have been previously mentioned. In particular, the system allows the pulse return signal of one particular frequency to be received simultaneously with the transmission of the CW or other different signal frequency. The characteristics of the limiter in combination with the generating circuitry also allow the CW and pulse frequencies to be changed on a pulse to pulse basis for frequency agility for operation in a countermeasure environment. This can be easily accomplished by varying the voltage of the VCO to change the carrier frequency from the generator 10. In addition, the frequency separation can be changed (by the frequency translator 11) to accommodate any contingency necessary for the successful operation of the system so long as the minimum frequency separation for proper ferrite limiter operation is maintained. In addition to the power protection and agility advantages, this system overcomes numerous power losses occasioned by the use of filters and diplexer circuitry. As such, the system provides for reduced weight, reduced power loss, fewer components, and increased system performance in combination with improved versatility. All of these are advantages that have not been recognized by the prior art as previously described.

While the invention has been described with particular reference to the use of specific transmitting and receiving circuitry, the inventive techniques are equally applicable to the employment of other circuitry consistent with such teachings. By way of example, the receiving processing circuitry 18 could be modified to include various additional limiting circuits capable of further separating and improving the received signal provided by protector 17. In addition, the particular elements of the generating circuitry 8 could be modified or rearranged to provide for plural signal generation in other configurations capable of providing similar benefits of frequency agility and low power loss. Further, the structure of the limiter is not restricted to those specifically described and could be modified to improve and extend the range of frequency reception and discrimination. It should also be noted that the frequencies $f_1$ and $f_2$ could be interchanged such that $f_1 > f_2$ or $f_2 > f_1$.

Obviously, many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An improved signal processing system comprising:
   means for generating a plurality of signals including,
      means for generating a CW rf signal,
      frequency translator means for forming a signal offset in frequency from said CW rf signal,
      means for pulse modulating said offset frequency signal,
      power combiner means for combining said CW and pulse modulated rf signals, and
      means for amplifying said combined signals;
   means coupled to said generator means for transmitting and receiving said signals; and
   means coupled to said transmitting and receiving means for limiting any of said received signals having a power level above a predetermined threshold and passing any signal having a power level below said predetermined threshold, said means for limiting including a broad band frequency selective limiter.

2. The apparatus of claim 1 wherein said means for transmitting and receiving comprises:
   an antenna,
   a duplexer circulator coupled to said antenna and to said amplifying means and limiting means for providing signals from said amplifying means to said antenna and from said antenna to said limiting means.

3. The apparatus of claim 2 further including means coupled to said limiting means for processing any signal having a power level below said predetermined threshold.

4. The apparatus of claim 1 wherein said generating means includes means for changing the frequency of the CW and pulsed signals to allow frequency agility.

5. An improved signal processing system comprising:
   means for generating a plurality of different frequency signals;
   means coupled to said generating means for transmitting said signals simultaneously;
   means for receiving signals having the same frequency as said transmitted signals; and
   means coupled to said receiving means for limiting any received signal having a power level above a predetermined threshold and passing any received signal having a power level below said predetermined threshold.

6. The apparatus of claim 5 wherein said means for generating includes means for creating a predetermined frequency separation $\Delta f$ between said plural frequencies.

7. The apparatus of claim 5 wherein said means for transmitting and said means for receiving are constructed as a single unit comprising:
   an antenna,
   a duplexer circulator coupled to said antenna and to said generating means and limiting means for providing signals from said generating means to said antenna for transmission and from said antenna to said limiting means.

8. The apparatus of claim 5 wherein said means for generating includes a means for generating one of said plurality of signals as a CW signal.

9. The apparatus of claim 8 wherein said means for generating further includes,
- means for forming a signal offset in frequency from said CW signal, and
- means for modulating said offset frequency signal.

10. The apparatus of claim 5 wherein said generating means includes means for changing the frequency of the plurality of signals to allow frequency agility.

11. An improved signal processing system comprising:
- means for generating a plurality of signals;
- means coupled to said generating means for transmitting and receiving signals, said means for transmitting and receiving being coupled to simultaneously transmit said plurality of signals; and
- means coupled to said transmitting and receiving means for limiting any of said received signals having a power level above a predetermined threshold and passing any signal having a power level below said predetermined threshold.

12. The apparatus of claim 11 wherein said means for limiting comprises a broad band frequency selective limiter.

13. The apparatus of claim 11 wherein said means for transmitting and receiving is constructed to transmit and receive signals simultaneously.

* * * * *